UNITED STATES PATENT OFFICE.

JOSEPH K. BOONE, OF BOONEVILLE, MISSOURI.

IMPROVEMENT IN COMPOSITIONS FOR PRESERVING EGGS.

Specification forming part of Letters Patent No. 167,637, dated September 14, 1875; application filed January 18, 1875.

*To all whom it may concern:*

Be it known that I, JOSEPH K. BOONE, of Booneville, in the county of Cooper and State of Missouri, have invented a new and Improved Compound for Preserving Eggs, of which the following is a specification:

My improved compound for the preservation of eggs consists of a solution of equal parts of lime and alum dissolved in hot water, which, for the preservation of eggs, forms a coating impervious to air that will maintain them in a fresh condition for a long time when the eggs are dipped in it and allowed to remain for eight or ten seconds.

The alum in my compound will close the pores of the shell, and cause the shrinkage of the same, while the lime acts as a whitening material, and when combined with the alum, in equal proportions, a cement is formed, which, when applied to the egg-shell, will produce thereon a smooth, polished, or glazed surface, free from pores and perfectly air-tight.

Having thus described my invention, I claim as new and desire to secure by Letters Patent—

The compound of alum and lime, in equal proportions, dissolved in hot water, for the preservation of eggs, substantially as specified.

JOSEPH K. $\overset{\text{his}}{+}$ BOONE.
mark.

Witnesses:
J. A. HOWARD,
W. W. TRENT.